United States Patent [19]
Gataric et al.

[11] Patent Number: 5,949,210
[45] Date of Patent: Sep. 7, 1999

[54] TWO-DIMENSIONAL VARIABLE LIMIT PROPORTIONAL INTERNAL REGULATOR FOR THE CURRENT CONTROLLER IN SYNCHRONOUS FRAME

[75] Inventors: Slobodan Gataric, Vestal; Arthur Paull Lyons, Maine, both of N.Y.

[73] Assignee: Lockheed Martin Corp., Johnson City, N.Y.

[21] Appl. No.: 09/039,895

[22] Filed: Mar. 16, 1998

[51] Int. Cl.$^6$ ................................................ G05B 11/36
[52] U.S. Cl. ......................................... 318/609; 318/809
[58] Field of Search ................................... 318/609, 610, 318/801–811; 364/160–162

[56] References Cited

U.S. PATENT DOCUMENTS

| | | | |
|---|---|---|---|
| 4,962,339 | 10/1990 | Schauder | 318/798 |
| 5,168,204 | 12/1992 | Schauder | 318/800 |
| 5,298,847 | 3/1994 | Kerkman et al. | 318/800 |
| 5,627,446 | 5/1997 | Deng et al. | 318/799 |
| 5,627,758 | 5/1997 | Lansberry et al. | 364/481 |
| 5,729,113 | 3/1998 | Jansen et al. | 318/799 |

*Primary Examiner*—Brian Sircus
*Attorney, Agent, or Firm*—W. H. Meise; G. H. Krauss

[57] ABSTRACT

A controller (400) for a variable-speed induction motor (498) includes field-oriented control (410, 476), which in a feedback (402) arrangement senses motor parameters to form field and torque error signals. The field error signals are processed by a first limited-state PI processor (490a), which individually limits the magnitude of the proportional component of the field voltage to no greater than the bus voltage. The field error signals are also processed by a state-limited integrator (426a) which limits the integral component of the field voltage to the difference between the proportional component and the bus voltage. A first summer (432a) sums the proportional and integral components to make the field voltage command. The torque error signals are processed by a further limited-state PI processor (490b) which individually limits the proportional component of the torque voltage to a value not greater than the available bus voltage, after the first PI processor has been given preference. The integral component of the torque voltage command is generated by a second state-limited integrator (426b) which limits the integral component of the torque voltage command so that the torque voltage command does not exceed the available bus voltage. A second summing circuit (432b) sums the proportional and integral components of the torque voltage command. The field and torque voltage commands are processed to produce the desired motor flux and torque, and a feedback loop forces the motor current to follow the commanded values.

8 Claims, 3 Drawing Sheets

TWO-DIMENSIONAL VARIABLE LIMIT PROPORTIONAL INTERNAL REGULATOR FOR THE CURRENT CONTROLLER IN SYNCHRONOUS FRAME

FIELD OF THE INVENTION

This invention relates generally to load controllers, and more particularly to controllers useful for controlling induction motors.

BACKGROUND OF THE INVENTION

Electric vehicles are becoming commercially important. Such vehicles include a traction battery and a traction motor. Some current proposals use a hybrid concept, in which an additional power source, such as a motor/generator, is used to improve the range of the vehicle by recharging the traction battery during operation. Since the vehicle is powered by a direct-voltage traction battery, some such vehicles use direct-voltage motors. The direct-current motor has brushes, which are a wear point. The dc brushless motor is a permanent-magnet motor, which is energized by alternating voltages. The induction motor is more robust, and may be cheaper to build in relatively high power output than the dc brushless motors.

Induction require variable-voltage, variable frequency alternating voltages for complete control. Some induction-motor controllers use Voltage/frequency (V/F) controllers, but the control is less thorough than Field-Oriented Control (FOC), and it is difficult to cause the induction motor to rotate above the "nominal" motor speed, which is the no-load speed at which the motor will spin when the specified drive voltage is applied. The induction motor can typically be spun at rotational speeds much greater than the nominal. It is desirable to connect induction traction motor to the drive wheels by a fixed gear ratio, in order to avoid the cost and weight of a transmission. When the traction motor is directly connected to the drive wheels, the considerations which determine the fixed gear ratio may be understood by considering as an example an induction motor which has a nominal speed of 4000 RPM, and which has a maximum possible (breakdown) rotational speed of 16000 RPM. If, on the one hand, it were desired to limit the maximum motor speed to 4000 RPM, and the desired maximum vehicle speed were to be 65 MPH, the gear reduction ratio would be four times less than if the maximum speed had been chosen as 16,000 RPM. Put another way, the gear reduction ratio which gives 65 MPH at 16000 RPM is greater than that required for 65 MPH at 4000 RPM. This larger gear reduction ratio, in turn, advantageously produces greater torque over the entire speed range. Therefore, the induction motor should be operated near the nominal bus voltage.

Figure 1:
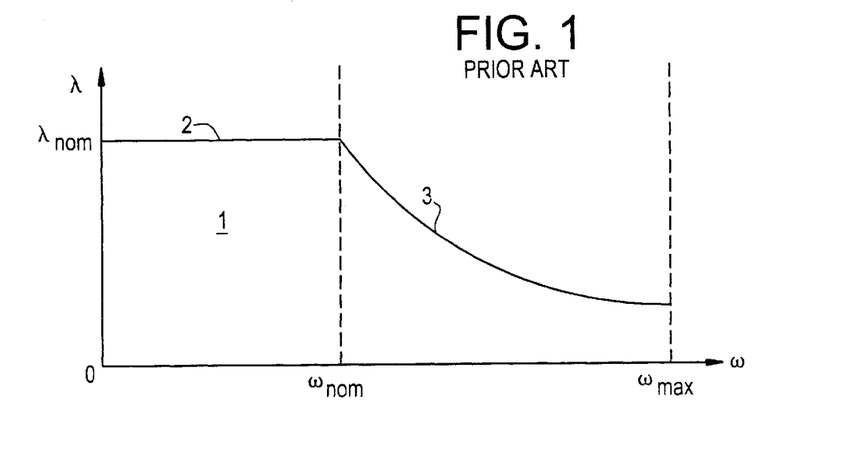
FIG. 1 is a simplified plot of flux versus speed in an induction motor.

FIG. 1 is a simplified plot 1 of the motor speed ω versus field strength λ characteristics of an induction motor, In FIG. 1, plot 1 includes a portion 2 which is constant at a flux value of $\lambda_{nominal}$ from zero to the nominal motor speed $\omega_{nominal}$. This portion of the plot represents an operating region in which the motor is not limited by the applied bus voltage, but rather by other considerations such as maximum winding current. Region 3 of plot 1 is a region in the motor speed is higher than the nominal speed $\omega_{nominal}$, in which the back electromotive force is given by $$V_{EMF} = \omega \cdot \lambda_{nom} \qquad 1$$

which indicates that at the nominal speed, the back EMF equals the specified bus voltage. The motor speed designated $\omega_{max}$ represents the speed at which centrifugal forces are expected to cause the rotor to disintegrate, and therefore represents an absolute maximum upper speed limit. At speeds ω higher than nominal speed $\omega_{nominal}$, the back EMF exceeds the bus voltage, so long as the flux field is maintained. Thus, the field strength must be reduced in order to operate at speeds above the nominal, in order to reduce the back EMF, so that some voltage differential remains between the bus voltage and the back EMF to cause motor current. However, reducing flux also reduces torque. In order to maintain the maximum amount of torque over the range of motor speeds from nominal speed to the selected maximum allowable speed (less than $\omega_{max}$, the back EMF must be maintained just below the bus voltage. Thus, the motor always operates near the limit of bus voltage in the region above the nominal speed. As a result, the stability may be compromised during those periods in which the controller demands application of more motor voltage than the maximum bus voltage.

Figure 2:
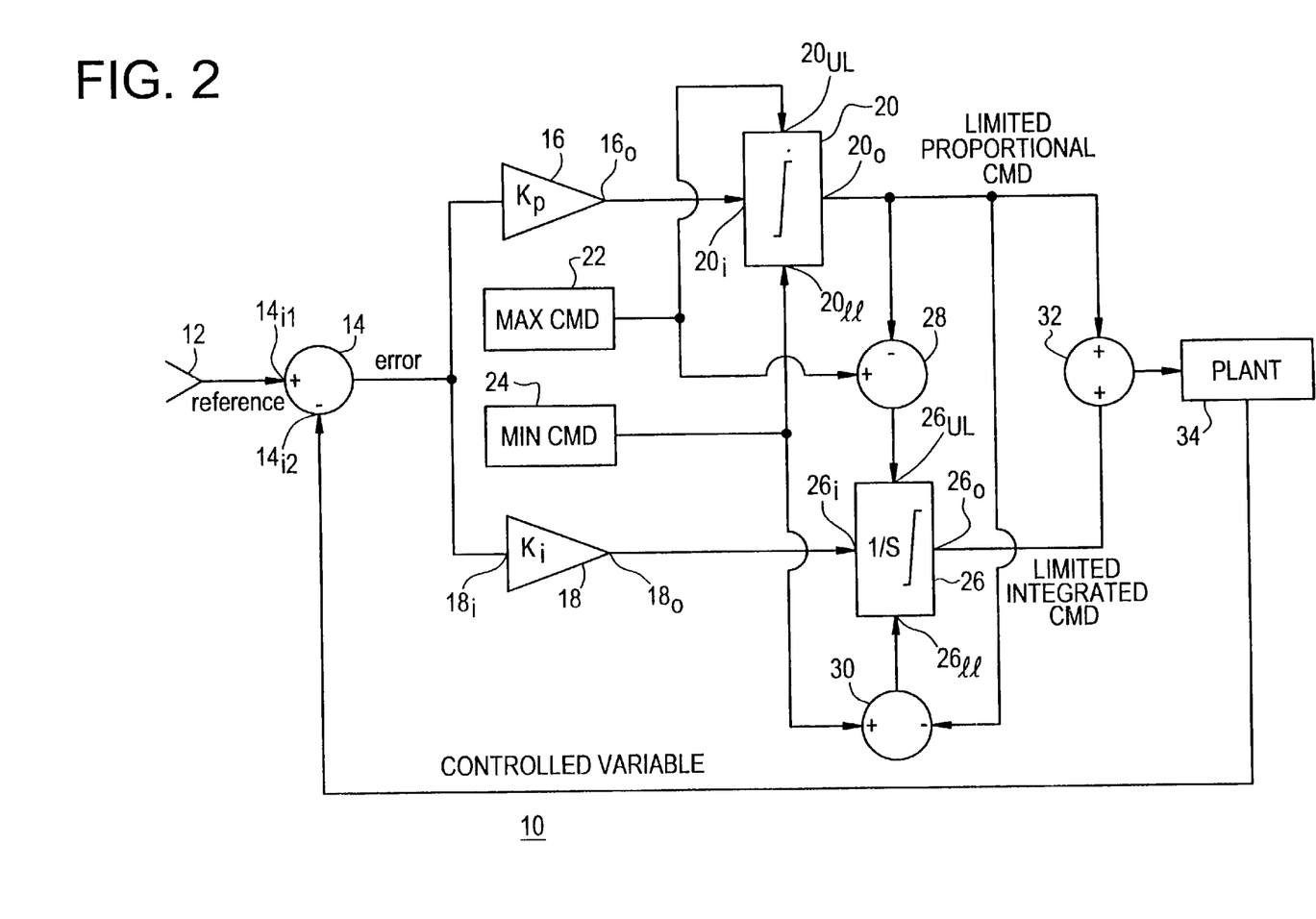
FIG. 2 is a simplified diagram in block and schematic form of a portion of a prior-art variable-threshold proportional-integral controller using a state-limited integrator.

State-limited proportional-integral regulators are known for use in control circuits, as described, for example, in "*Nonlinear Algorithms for Fast and Robust Control of Electrical Drive*" by Dusan Borojevic, PHD Dissertation, 1986, Virginia Polytechnic Institute & State University, Blacksburg, Va. FIG. 2 is a simplified block diagram of a control system 10 according to the prior art. In FIG. 2, reference signal or user's command is applied by way of a terminal 12 to a noninverting (+) input port 14*i*1 of an error signal generator 14. It should be understood that the signals described herein represent the values which their names suggest, so that, for example, a motor field voltage command signal represents, whether directly or by a proportionality constant, the actual value of field, or of the field current, or of the corresponding values of the field itself or of the current producing the field as measured in other reference systems, so that the signal processing can be described in terms of the representative signals or the values which the signals represent. Error signal generator 14 of FIG. 2 subtracts from the reference signal a feedback signal representing the controlled variable which is applied to inverting (−) input port 14*i*2, to produce the system error signal. The error signal is applied to first and second multipliers 16 and 18, respectively. First multiplier 16 multiplies the error signal by a constant $K_p$, as known in the art, to produce a proportional command component at its output port 16*o*. The proportional command component is applied to an input port 20*i* of a limiter 20. Limiter 20 limits the range of the proportional command to lie between maximum and minimum values applied to its upper limit port 20*ul* and lower limit port 20*ll*, respectively. The upper limit signal or value applied to upper limit port 20*ul* of limiter 20 is produced by MAX CMD source 22, and the lower limit signal or value applied to lower limit input port 20*ll* is produced by MIN CMD source 24. Limiter 20 produces a limited proportional command signal at its output port 20*o*.

Second multiplier 18 of FIG. 2 multiplies, by a constant $K_i$, the error signal applied to its input port 18*i*, to thereby produce a signal at its output port 18*o* which, due to the action of the feedback loop as described below, represents the first derivative of the integral component of the limited integrated command. State-limited integrator 26 integrates the signal from output port 18*o* of multiplier 18, to produce an integrated signal which is limited by limiting the integration state of the limiter 26. More particularly, the integration state of state-limited integrator 26 is limited to lie below an upper value applied to its upper limit port 26*ul*, and to lie above a lower value applied to its lower limit port 26*ll*.

The upper limit signal applied to the upper limit port 26*ul* of state-limited integrator 26 is represented by the output signal of a subtracting or differencing circuit 28. Differencing circuit 28 takes the difference between the limited proportional component of the command, from output port 20*o* of limiter 20, and the MAX CMD value from source 22. Similarly, the lower limit signal applied to the lower limit port 26*ll* of state-limited integrator 26 is produced by a differencing circuit 30, which subtracts the limited proportional component of the command signal from the MIN CMD value produced by source 24. Thus, the upper integration limit of integrator 26 is limited to lie below the maximum limit established by differencing circuit 28, and the lower integration limit of integrator 26 is limited to lie above the minimum limit established by differencing circuit 30. The output at output port 26*o* of limiting integrator 26 is the limited integrated component of the command signal.

A summing circuit 32 of FIG. 2 sums the limited proportional components and the limited integrated component of the command signals, to produce the total command signal for controlling the plant 34. The plant 34 responds to the command signals to adjust the controlled variable and therefore the feedback signals which return to the inverting input port 14*i*2 of error signal generator 14 to close the degenerative feedback loop. The arrangement of FIG. 2 has the advantage of, in the presence of a transient input or reference signal, limiting overshoot attributable to slow response of the plant in conjunction with the time constant of the integrator.

When two control limiters were used to control the field and torque components of an induction motor, the motor control was unstable in certain operating modes. Improved induction motor controllers are desired.

SUMMARY OF THE INVENTION

A system according to the invention uses an induction motor powered from a direct voltage bus having a bus voltage. The system includes a field-oriented controller for generating mutually orthogonal flux and torque current commands in a synchronous frame. A first error signal generator is coupled to the field-oriented controller, for subtracting feedback field current signals from the flux current command signals, for thereby generating field current error signals. A second error signal generator is coupled to the field-oriented controller, for subtracting feedback torque current signals from the torque current commands, for thereby generating torque current error signals. A first variable-limit proportional-integral regulator is coupled to the first error signal generator, and responsive to the flux current error signal. The first variable-limit proportional-integral regulator generates commanded flux voltage signals including proportional and integral components, and limits each of the proportional and integral components of the commanded flux voltage to a value such that the sum of the proportional and integral components of the commanded flux voltage is no greater than the available bus voltage. A second variable-limit proportional-integral regulator is coupled to the second error signal generator, and responsive to the torque current error signals. The second variable-limit proportional-integral regulator generates commanded torque voltage signals including proportional and integral components, and limits each of the proportional and integral components of the commanded torque voltage to a value selected so that the magnitude of the vector sum of the commanded flux voltage and the commanded torque voltage is no greater than the available bus voltage. A feedback arrangement is coupled to sense current in the windings of the motor, for generating the feedback field current signals and the feedback torque current signals, and for coupling the feedback field current signals to the first error signal generator and the feedback torque current signals to the second error signal generator, for thereby closing a motor controlling current feedback loop.

In a particular embodiment of the invention, the first variable-limit proportional-integral regulator further includes a first multiplier coupled to receive the field current error signals, for generating a signal representative of a proportional component of the motor field voltage. A first limiter is coupled to the first multiplier to receive the signal representative of a proportional component of the motor field voltage, for limiting the signal representative of a proportional component of the motor field voltage to the maximum voltage of the bus, for thereby generating a signal representative of a limited proportional component of the motor field voltage. A second multiplier is coupled to receive the field current error signals, for generating a signal representative of the first derivative of the integral component of the field voltage. A state-limited integrator is coupled to the second multiplier for receiving the signal representative of the first derivative of the integral component of the field voltage, and for integrating the signal representative of the first derivative of the integral component of the field voltage, for thereby creating a first integrated signal. The first integrated signal is limited to a value such that the sum of (a) the first integrated signal and (b) the signal representative of a proportional component of the flux voltage (c) is no greater than the bus voltage. A first summing arrangement is coupled to the first limiter and to the state-limited integrator, for summing the signal representative of a limited proportional component of the motor field voltage with the first integrated signal, for thereby generating signals representative of the commanded flux voltage. In a further avatar of this embodiment, the second variable-limit proportional-integral regulator includes a torque voltage limit signal generator coupled to the first variable-limit proportional-integral regulator, for responding to the commanded flux voltage, by generating a torque voltage limit signal which represents the square-root of the difference between (a) the square of the commanded flux voltage and (b) the square of the available bus voltage. A third multiplier is coupled to receive the torque current error signals, for generating a signal representative of a proportional component of the motor torque voltage. A second limiter is coupled to the third multiplier to receive the proportional component of the motor torque voltage, for limiting the proportional component of the motor torque voltage to the value represented by the torque voltage limit signal, for thereby generating a limited proportional component of the motor torque voltage. A fourth multiplier is coupled to receive the torque current error signals, for generating a signal representative of the first derivative of the integral component of the torque voltage. A second state-limited integrator is coupled to the fourth multiplier for integrating the signal representative of the first derivative of the integral component of the torque voltage, for thereby creating a second integrated signal. The second integrated signal is limited such that the sum of the second integrated signal and the limited proportional component of the motor torque voltage is no greater than the torque voltage limit signal. A second summing arrangement is provided, for summing the limited proportional component of the motor torque voltage and the second integrated signal, for thereby generating the commanded torque voltage.

A preferred embodiment uses the system to control a traction motor coupled to the drive wheels of a vehicle which is electrically powered, as for example a hybrid electric vehicle.

A method according to the invention, for controlling an induction motor driven from a direct voltage bus, includes the step of generating field current command signals and torque current command signals. Field current error signals are generated by subtracting field current feedback signals from the field current command signals. Torque current error signals are generated by subtracting torque current feedback signals from the torque current command signals. The field current error signals are multiplied by first and second constants to thereby produce field and second signals. The field voltage signal is limited to a value which represents no more than the available bus voltage of the direct voltage bus, to thereby produce a limited proportional field voltage signal. The second signals are integrated in a state-limited manner, to thereby generate integrated field voltage signals, with the state of the integrator being limited such that the sum of (a) the limited proportional field voltage signals and (b) the integrated field voltage signals (c) represents no more than the bus voltage. The limited proportional field voltage signals are summed with the integrated field voltage signals to thereby produce flux voltage command signals. Limiting signals are generated which are representative of the square-root of the difference between (a) the square of the available bus voltage and (b) the square of the flux voltage command. The torque error signals are multiplied by third and fourth constants, to thereby produce signals representative of the proportional component of the torque voltage and a fourth signal, respectively. The signals representative of the proportional component of the torque voltage are limited to represent a value not greater than the limiting signals, to thereby produce limited proportional torque voltage signals. The fourth signals are integrated in a state-limited manner, to thereby generate integrated torque voltage signals, to thereby produce integrated torque voltage signals; the state of the integrator is limited such that the sum of (a) the limited proportional torque voltage signals and (b) the integrated field voltage signals represents no more than the limiting signal. The proportional torque voltage signals and the integrated torque voltage signals are summed, to produce torque voltage command signals. The field voltage command signals and the torque voltage command signals are converted into motor winding currents. The motor winding currents are sensed to produce sensed motor winding current signals, and the sensed motor winding current signals are converted into the field current feedback signals and the torque current feedback signals.

DESCRIPTION OF THE INVENTION

Figure 3A:
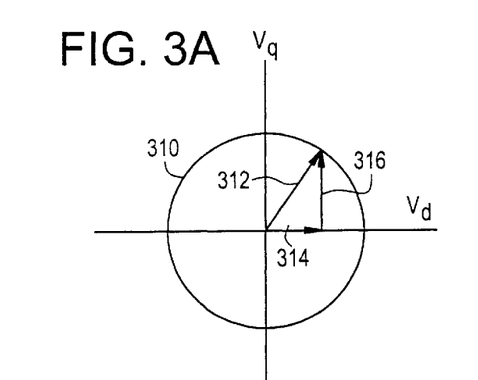
FIGS. 3a, 3b, 3c, and 3d are representations of synchronous frames having d and q axes, associated with operation of an induction motor.

FIG. 3a is a diagram showing bus voltage in the synchronous control frame of an FOC-controlled induction motor,
showing the $V_q$ and $V_d$ axes. In FIG. 3a, the circle 310 represents the maximum bus voltage, and vector 312 represents the magnitude of the alternating voltage applied to the motor. Vector 312 has a component 314 lying along the $V_d$ axis and a component 316 lying parallel to the $V_q$ axis. A motor operated under the condition illustrated in FIG. 3a is at maximum available bus voltage, which means that the motor is at a speed which is not less than nominal, because, at speeds below nominal, the back EMF of the motor is less than the nominal bus voltage, and full bus voltage should not be applied; full bus voltage is only applied when the back EMF is high. The output of the regulator may issue a voltage command such as that illustrated as a vector 318 in FIG. 3b, which produces components 320 along the $V_d$ axis, and component 319 along the $V_q$ axis. Clearly, the actual bus voltage cannot provide the commanded value 319. Thus, when the applied motor voltage is limited to the actual maximum bus voltage, the vector 318 is reduced in magnitude, with the reduced-magnitude vector 318 being illustrated in FIG. 3c as 324. When reduced in this manner, the applied motor voltage 324 produces components 326 and 328 along the d and q axes, respectively, which are proportionally reduced in magnitude relative to their original values 320 and 319.

Figure 3B:
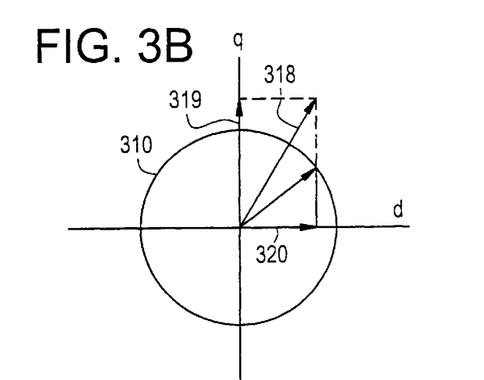
Figure 3C:
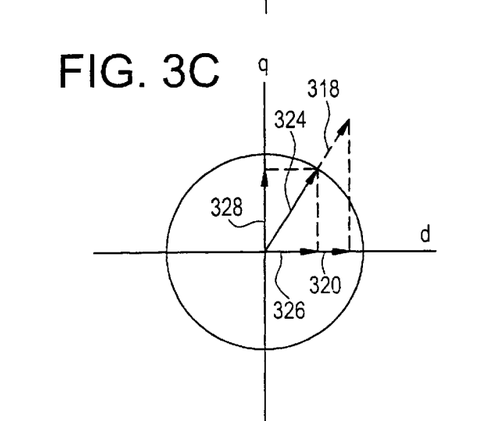
Figure 3D:
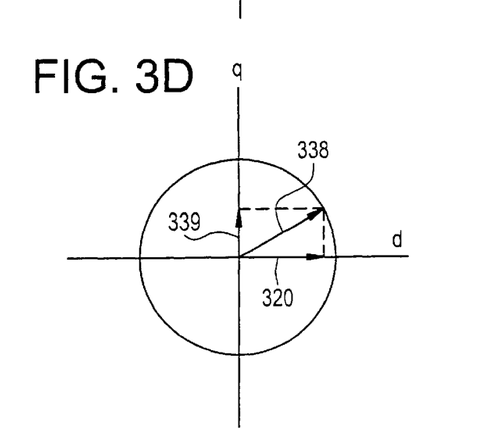

It has been discovered that, in controllers such as that described in conjunction with FIG. 2, the proportional reduction in the d and q components of the applied motor voltage results in transient response characterized by motor currents which are greater than desired, and possibly by some instability in certain operating modes. According to an aspect of the invention, the applied vector voltage, such as 318 of FIG. 3b, is rotated and adjusted in magnitude in the FOC synchronous frame whenever its commanded value tends to exceed the maximum available bus voltage 320. Thus, in FIG. 3d, whenever the commanded applied voltage would be represented by vector 318 of FIG. 3b, the commanded voltage is instead rotated and reduced in magnitude, as represented by vector 338 of FIG. 3b, in such a manner as to maintain the magnitude of the flux voltage component 320 of FIG. 3b. As illustrated in FIG. 3d, the rotated position 338 of original greater-than-bus vector 318, and its reduced magnitude, result in a q-axis or torque component which is much reduced relative to its original commanded value. It has been found that by maintaining the flux magnitude 320 and allowing the torque magnitude to be reduced, as from 319 to 339, the motor control is stabilized relative to the situation, represented in the transition from FIG. 3b to 3c, in which the magnitude of the commanded vector 318 is simply reduced without maintaining more-or-less constant flux command.

Figure 4:
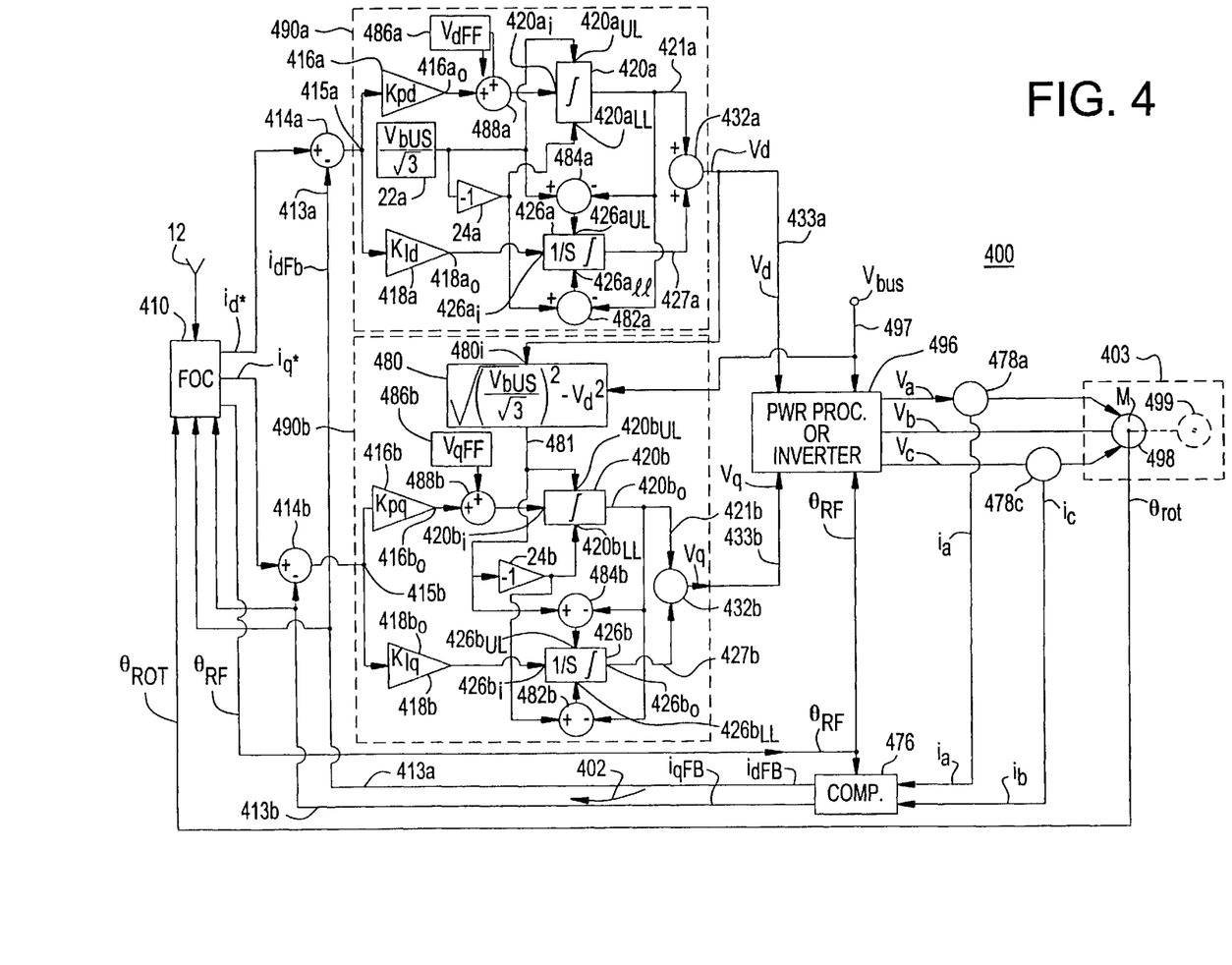
FIG. 4 is a simplified diagram in block and schematic form, illustrating an induction motor control circuit according to an aspect of the invention.

FIG. 4 is a simplified diagram in block and schematic form of a control system according to the invention. This particular control system controls the traction motor of a electric motor vehicle, which may be a hybrid electric vehicle. In FIG. 4, a field-oriented oriented motor control (FMC) 410 receives torque input signals and motor speed signals, and produces $i_{d*}$ and $i_{q*}$ signals, which are applied to the noninverting input ports of error signal generators 414a and 414b, respectively. Error signal generators 414a and 414b subtract feedback motor current signals $i_{dFB}$ and $i_{qFB}$, respectively, from their respective $i_{d*}$ and $i_{q*}$ signals, to produce flux and torque error signals on signal paths 415a and 415b, respectively.

The field flux (d) error signal from error signal generator 414a of FIG. 4 is applied to a block 490a, which is generally similar to block 10 of FIG. 2. In FIG. 4, the field flux error signal from error signal generator 414a is applied by way of a junction of path 415a to a multiplier 416a, which multiplies the field flux error signal by a proportionality constant $K_{pd}$. The multiplied field flux error signal from the output port 416ao of multiplier 416a is applied by way of a summing circuit 488a to the input port 420ai of limiter 420a. Summing circuit 488a adds a feed-forward correction signal $V_{dFF}$ generated by means, illustrated as a block 486a, to the multiplied field flux error signal from multiplier 416a, to correct for cross-coupling of signals between the d and q channels of system 400. The cross-coupling-corrected multiplied field flux error signal applied to limiter 420a is limited, much as described in conjunction with limiter 20 of FIG. 2. The upper limit applied to upper limit input port 420aul of limiter 420a is equal to the maximum available bus voltage $V_{available}$, which in the context of a three-phase induction motor is equal to $$V_{available} = \sqrt{\left(\frac{V_{dc}}{\sqrt{3}}\right) - V_d^2} \qquad 2$$

The $V_{available}$ signal is produced at the output of source 22a and applied directly to upper limit input port 420aul of limiter 420a, and by way of an inverter or −1 operator 24a to the lower limit input port 420all of limiter 420a. Thus, the maximum and minimum values of the output signal from limiter 420a correspond to the available bus voltage. The limited proportional component of the field current voltage is applied from limiter 420a by way of a signal path 421a to a noninverting input port of a summing circuit 432a.

The field flux (d) error signal from error signal generator 414a of FIG. 4 is also applied by way of the junction of path 415a to a multiplier 418a, which multiplies the field flux error signal by an integral constant $K_{Id}$. Due to the action of the overall feedback loop, described below, the multiplied field flux error signal from the output port 418ao of multiplier 418a has the dimensions of volts/seconds, and represents the first derivative of the integral component of the field voltage command $V_d$. The field voltage command signal commands the power signal processor or inverter 496 to produce an effective field voltage across the motor windings which is sufficient to cause the desired field current equivalent to flow in the motor. As mentioned above, the signals described herein represent the values which their names suggest, so that the field voltage command signal $V_d$ represents, whether directly or by a proportionality constant, the actual value of the magnetic field of the field winding of the motor, or the value of magnetic field corresponding in function to the field of the field winding, as measured in a different coordinate system, so that the signal processing can be described in terms of the representative signals or the values which the signals represent. More particularly, FOC control contemplates analysis and signal processing in d and q coordinates corresponding to motor field and torque, but the currents applied to the induction motor are not readily separable into field and torque components, but are instead measured in a, b, and c coordinates. The first derivative of the integral component of the field voltage command, or more properly the signal representative of the first derivative of the integral component of the field voltage command, is applied from output port 418ao of multiplier 418a to the input port 426ai of a state-limited integrator 426a of block 490a. A differencing circuit 484a has its inverting input port coupled to signal path 421a to receive the limited proportional component of the field voltage current command, and also has a noninverting input port coupled to source 22a, for receiving signal representing the available bus voltage.

Differencing circuit 484a takes the difference between the limited proportional component of the field voltage command and the available bus voltage, to generate the upper limit signal for application to upper limit input port 426aul of state-limited integrator 426a. Similarly, a differencing circuit 482a has an inverting input port coupled to signal path 421a for receiving the limited proportional component of the field voltage command, and also includes a noninverting input port coupled to the output of inverter 24a, for taking the difference between the limited proportional component of the field voltage command $V_d$, and applies the difference to the lower limit input port 426all of state-limited integrator 426a. State-limited integrator 426a produces the integral component of the field voltage command, and applies it over a signal path 427a to a second noninverting input port of summing circuit 432a.

Summing circuit 432a of FIG. 4 sums the limited proportional and limited integral components of the field voltage command, and produces a field voltage command signal $V_d$ on a signal path 433a for application to a coordinate converting block illustrated as 496.

As described below, coordinate converter block 496 receives the field voltage command signals $V_d$ from path 433a, bus voltage from bus 497, and also receives torque voltage command signals $V_q$ and motor 498 field position indicative signals $\theta_{RF}$, for generating the a, b, and c components of voltage which energize the windings and command the motor.

As mentioned above, error signal generator 414b subtracts feedback motor current signals $i_{qFB}$ from its $i_{q*}$ reference or input signals, to produce torque error signals on signal path 415b. The torque flux (q) error signal from error signal generator 414b of FIG. 4 is applied to a block 490b, which is generally similar to block 10 of FIG. 2 and block 490a of FIG. 4. In FIG. 4, the torque flux error signal from error signal generator 414b is applied by way of a path 415b to a multiplier 416b, which multiplies the torque flux error signal by a proportionality constant $K_{pq}$. The multiplied torque flux error signal from the output port 416bo of multiplier 416b is applied by way of a summing circuit 488b to the input port 420bi of limiter 420b. Summing circuit 488b adds a feed-forward correction signal $V_{qFF}$ generated by means, illustrated as a block 486b, to the multiplied field flux error signal from multiplier 416b, to correct for cross-coupling of signals between the d and q channels of system 400. The cross-coupling-corrected multiplied torque flux error signal is applied to limiter 420b and is limited, much as described above in conjunction with limiter 420a.

Control block 490b of FIG. 4 includes a block 480 coupled to the bus 497 for receiving bus voltage $V_{bus}$, and also includes a further input port 480i coupled to signal path 433a, for receiving the field limited voltage command signal $V_d$. Block 480 establishes a torque voltage limit signal $V_{torque\ limit}$ which is applied to a torque limit value bus 481. The value of $V_{torque\ limit}$ as calculated in block 480 sets a limit on the magnitudes of the proportional and integral components of the torque voltage command signals $V_q$ controlled by the limiters of block 490b, in such a manner that the values which the torque voltage command signals are allowed are limited to the remainder after the field voltage command signals $V_d$ command as much field voltage as may be necessary, in a closed-loop condition, to achieve the desired field current. Put another way, the values selected in block 480, in conjunction with the limiting values selected in block 490a, give preference to the field voltage commands $V_d$, providing the motor with the commanded field current up to the commanded value, and allowing the torque voltage commands $V_q$ to command only so much of the bus voltage as may remain available. Thus, according to an aspect of the invention, priority or preference is given to the field current over the torque current.

The value of $V_{torque\ limit}$ produced by block 480 of FIG. 4 is applied to the upper limit input port 420bul of limiter 420b, and an inverted value of $V_{torque\ limit}$ is applied, by way of an inverting or −1 multiplying circuit illustrated as 24b, to the lower limit input port 420bll of limiter 420b. Limiter 420b limits the value of the cross-coupling-corrected multiplied torque flux error signal applied to input port 420bi of limiter 420b to lie between the $+V_{torque\ limit}$ applied to limit input port 420bul and the $-V_{torque\ limit}$ applied to lower limit input port 420bll. The limited proportional component of the torque voltage command $V_q$ is generated at the output port 420bo of limiter 420b, and is applied over a signal path 421b to a noninverting input port of a summing circuit 432b, to be summed therein with a limited integral portion or component of the torque voltage command.

The torque error signals produced on signal path 415b by error signal generator 414b of FIG. 4 are applied to a further multiplier 418b for multiplication by a constant $K_{iq}$, and the resulting signal, having dimensions of volts/seconds, and representing the first derivative of the integral component of the torque voltage command $V_q$, is applied to an input port 426bi of a state-limited integrator 426b. State-limited integrator 426b integrates the signal applied to its input port 426bi, so long as its state does not exceed the limits applied to its upper and lower limit input ports 426bul and 426bll, respectively. The upper limit value is generated by a differencing circuit 484b, which includes an inverting input port coupled to receive the limited proportional component of the torque voltage command from signal path 421b, and which also includes a noninverting input port coupled to receive the torque voltage limit signal $V_{torque\ limit}$ by way of path 481 from block 480. Differencing circuit 484b takes the difference between the torque voltage limit signal $V_{torque\ limit}$ and the limited proportional component of the torque voltage command, to produce the upper limit value for application to upper limit input port 426bul of state-limited integrator 426b. Similarly, a further differencing circuit 482b has an inverting input port coupled to receive the limited proportional component of the torque voltage command from signal path 421b, and also includes a noninverting input port coupled to receive the inverted torque voltage limit signal $-V_{torque\ limit}$ from inverter 24b. State-limited integrator 426b produces the limited integral component of the torque voltage command on signal path 427b for application to summing circuit 432b. Summing circuit 432b sums the limited proportional component of the torque voltage command with the limited integral component of the torque voltage command to produce the torque voltage command $V_q$ on a signal path 433b.

In FIG. 4, the field voltage command $V_d$ produced by block 490a on signal path 433a and the torque voltage command $V_q$ produced by block 490b on signal path 433b are summed together in a processing block 496. Processing block 496 receives $\theta_{RF}$ signals representative of the angular position of the flux of motor 498, the field and torque voltage commands, and converts the commands to abc coordinates, for controlling the portion of the voltage from bus 497 which is applied as $V_a$, $V_b$, and $V_c$ energization to the three-phase windings of induction motor 498. The angular position of the rotor of motor 498 is sensed and applied over a signal path $\theta_{ROT}$ to FOC controller 410 for use therein.

The current in the windings of motor 498 of FIG. 4 can be determined by measurement of current in but two of the a, b, and c motor windings, as for example by measuring the current in the a and c paths. Current sensors, illustrated as 478a and 478c, are coupled to the a and c paths of motor 498 and produce current-representative signals $i_a$ and $i_c$ which are applied to a computation block illustrated as 476. Block 476, using information $\theta_{RF}$ relating to the position of the field of motor 498, produces motor current feedback signals in synchronous field form, namely in the form of $i_{dFB}$ and $i_{qFB}$ signals, which are applied back to the FOC controller 410, and to the inverting input ports of error signal generators 414a and 414b, respectively, This feedback closes a degenerative feedback loop designated generally as 402, which tends to cause the motor currents to flow in a manner which provides performance represented by the field and torque voltage commands.

Other embodiments of the invention will be apparent to those skilled in the art. For example, the described signal processors may be either analog or digital in nature, although digital is much preferred. The digital signals may be processed by dedicated hardware processors, or preferably by software operating in a general-purpose processor. The digital signals may be in parallel or serial form, as the nature of the subsystem may require, with appropriate conversion.

Thus, a system (400) according to the invention uses an induction motor (498) powered from a direct voltage bus (497) having a bus voltage. The system (400) includes a field-oriented controller (410) for generating mutually orthogonal flux ("field") and torque current commands ($i_d^*$, $I_q^*$) in a synchronous frame (such as that of FIGS. 3a or 3b). A first error signal generator (414a) is coupled to the field-oriented controller (410), for subtracting feedback field current signals ($i_{dFB}$ on conductor 413a) from the flux current command signals ($i_d^*$), for thereby generating field current error signals (on path 415a). A second error signal generator (414b) is coupled to the field-oriented controller (410), for subtracting feedback torque current signals ($i_{qFB}$ on signal path 413b) from the torque current commands ($i_q^*$), for thereby generating torque current error signals (on path 415b). A first variable-limit proportional-integral regulator (490a) is coupled to the first error signal generator (414a), and is responsive to the flux current error signal. The first variable-limit proportional-integral regulator (490a) generates commanded flux voltage signals ($V_d$ on signal path 433a) including proportional and integral components (on paths 421a and 427a, respectively), and limits each of the proportional and integral components of the commanded flux voltage ($V_d$) to a value such that the sum of the proportional and integral components of the commanded flux voltage ($V_d$) is no greater than the available bus (497) voltage. A second variable-limit proportional-integral regulator (490b) is coupled to the second error signal generator (414b), and is responsive to the torque current error signals. The second variable-limit proportional-integral regulator (490b) generates commanded torque voltage signals ($V_q$ on signal path 433b) including proportional and integral components (on signal paths 421b and 426b, respectively), and limits each of the proportional and integral components of the commanded torque voltage ($V_q$) to a value selected so that the magnitude of the vector sum (312 of FIG. 3a, for example) of the commanded flux voltage ($V_d$) and the commanded torque voltage ($V_q$) is no greater than the available bus voltage (310). A feedback arrangement (413a, 413b, 476, 478a, 478b, $\theta_{ROT}$) is coupled to sense current in the windings of the motor 498, for generating the feedback field current signals ($i_{dFB}$) and the feedback torque current signals ($i_{qFB}$), and for coupling the feedback field current signals ($i_{dFB}$) to the first error signal generator (414a) and the feedback torque current signals ($i_{qFB}$) to the second error signal generator (414b), for thereby closing a motor controlling current feedback loop (402). The feedback arrangement (402) also includes portions ($\theta_{ROT}$) for sensing the motor rotor position.

In a particular embodiment of the invention, the first variable-limit proportional-integral regulator (490a) further includes a first multiplier (416a) coupled to receive the field current error signals, for generating a signal representative of a proportional component of the motor field voltage. A first limiter (420a) is coupled to the first multiplier (416a) to receive the signal (at port 420ai) representative of a proportional component of the motor field voltage, for limiting the signal representative of a proportional component of the motor field voltage to the maximum voltage of the bus, for thereby generating (on signal path 421a) a signal representative of a limited proportional component of the motor field voltage. A second multiplier (418a) is coupled to receive the field current error signals, for generating (at port 418ao) a signal representative of the first derivative of the integral component of the field voltage. A state-limited integrator (426a) is coupled to the second multiplier (418a) for receiving the signal representative of the first derivative of the integral component of the field voltage, and for integrating the signal representative of the first derivative of the integral component of the field voltage, for thereby creating a first integrated signal. The first integrated signal is limited (by limiting the state of the integrator) to a value such that the sum of (a) the first integrated signal and (b) the signal representative of a proportional component of the flux voltage (c) is no greater than the bus (497) voltage; the first integrated signal when so limited is the integral component of the field voltage command ($V_d$). A first summing arrangement (432a) is coupled to the first limiter (420a) and to the state-limited integrator (426a), for summing the signal representative of a limited proportional component of the field voltage command with the first integrated signal (equivalent to the integral component of the field voltage command), for thereby generating ($V_d$) signals representative of the commanded flux voltage. In a further avatar of this embodiment, the second variable-limit proportional-integral regulator (490b) includes a torque voltage limit signal generator (480) coupled to the first variable-limit proportional-integral regulator (490a), for responding to the commanded flux voltage ($V_d$ on signal path 433a), by generating a torque voltage limit signal (on path 481) which represents the square-root of the difference between (a) the square of the commanded flux voltage and (b) the square of the available bus voltage. A third multiplier (416b) is coupled to receive the torque current error signals (from path 415b), for generating (at its output port 416bo) a signal representative of a proportional component of the motor torque voltage command ($V_q$). A second limiter (420b) is coupled to the third multiplier (416b) to receive the proportional component of the motor torque voltage, for limiting the proportional component of the motor torque voltage to the value (on signal path 481) represented by the torque voltage limit signal, for thereby generating (at its output port 420bo) a limited proportional component of the motor torque voltage ($V_q$). A fourth multiplier (418b) is coupled (to signal path 415b) to receive the torque current error signals, for generating a signal (at the output port 418bo) representative of the first derivative of the integral component of the torque voltage ($V_q$). A second state-limited integrator (426b) is coupled to the fourth multiplier (418b) for integrating the signal representative of the first derivative of the integral component of the torque voltage, for thereby creating (on signal path 427b) a second integrated signal (which is equivalent to the integral component of the torque voltage command $V_q$) The second integrated signal is limited such that the sum of the second integrated signal and the limited proportional component of the motor torque voltage is no greater than the torque voltage limit signal (on signal path 481). A second summing arrangement (432b) is provided, for summing the limited proportional component of the motor torque voltage and the second integrated signal, for thereby generating the commanded torque voltage ($V_q$).

A preferred embodiment uses the system to control a traction motor (498) coupled to the drive wheels (499) of a vehicle (403) which is electrically powered, as for example a hybrid electric vehicle.

What is claimed is:

1. A system which uses an induction motor powered from a direct voltage bus having a bus voltage, said system comprising:

a field-oriented controller for generating mutually orthogonal flux and torque current commands in a synchronous frame;

a first error signal generator coupled to said field-oriented controller, for subtracting feedback field current signals from said flux current command signals, for thereby generating field current error signals;

a second error signal generator coupled to said field-oriented controller, for subtracting feedback torque current signals from said torque current commands, for thereby generating torque current error signals;

a first variable-limit proportional-integral regulator coupled to said first error signal generator, and responsive to said flux current error signal, said first variable-limit proportional-integral regulator generating commanded flux voltage signals including proportional and integral components, and limiting each of said proportional and integral components of said commanded flux voltage to a value such that the sum of said proportional and integral components of said commanded flux voltage is no greater than the available bus voltage;

a second variable-limit proportional-integral regulator coupled to said second error signal generator, and responsive to said torque current error signals, said second variable-limit proportional-integral regulator generating commanded torque voltage signals including proportional and integral components, and limiting each of said proportional and integral components of said commanded torque voltage to a value selected so that the magnitude of the vector sum of said commanded flux voltage and said commanded torque voltage is no greater than the available bus voltage;

feedback means coupled to sense current in the windings of said motor, for generating said feedback field current signals and said feedback torque current signals, and for coupling said feedback field current signals to said first error signal generator and said feedback torque current signals to said second error signal generator, for thereby closing a motor controlling current feedback loop.

2. A system according to claim 1, wherein said first variable-limit proportional-integral regulator further comprises:

a first multiplier coupled to receive said field current error signals, for generating a signal representative of a proportional component of said motor field voltage;

a first limiter coupled to said first multiplier to receive said signal representative of a proportional component of said motor field voltage, for limiting said signal representative of a proportional component of said motor field voltage to the maximum voltage of said bus, for thereby generating a signal representative of a limited proportional component of said motor field voltage;

a second multiplier coupled to receive said field current error signals, for generating a signal representative of the first derivative of the integral component of said field voltage;

a state-limited integrator coupled to said second multiplier for receiving said signal representative of the first derivative of the integral component of said field voltage, and for integrating said signal representative of the first derivative of the integral component of said field voltage, for thereby creating a first integrated signal, said first integrated signal being limited to a value such that the sum of said first integrated signal and said signal representative of a proportional component of said flux voltage is no greater than said bus voltage;

a first summing arrangement coupled to said first limiter and said state-limited integrator, for summing said signal representative of a limited proportional component of said motor field voltage and said first integrated signal, for generating signals representative of said commanded flux voltage.

3. A system according to claim 2, wherein said a second variable-limit proportional-integral regulator comprises:

a torque voltage limit signal generator coupled to said first variable-limit proportional-integral regulator, for responding to said commanded flux voltage, for generating a torque voltage limit signal which represents the square-root of the difference between (a) the square of said commanded flux voltage and (b) the square of the available bus voltage;

a third multiplier coupled to receive said torque current error signals, for generating a signal representative of a proportional component of the motor torque voltage;

a second limiter coupled to said third multiplier to receive said proportional component of said motor torque voltage, for limiting said proportional component of said motor torque voltage to the value represented by said torque voltage limit signal, for thereby generating a limited proportional component of said motor torque voltage;

a fourth multiplier coupled to receive said torque current error signals, for generating a signal representative of the first derivative of the integral component of said torque voltage;

a second state-limited integrator coupled to said fourth multiplier for integrating said signal representative of the first derivative of the integral component of said torque voltage, for thereby creating a second integrated signal, said second integrated signal being limited such that the sum of said second integrated signal and said limited proportional component of said motor torque voltage is no greater than said torque voltage limit signal;

a second summing arrangement, for summing said limited proportional component of said motor torque voltage and said second integrated signal, for generating said commanded torque voltage.

4. A system according to claim 1, further comprising:
a vehicle body; and
vehicle running gear coupled to said body and to said motor, for causing said vehicle to move in response to rotation of said motor.

5. An electric vehicle which uses an induction traction motor powered from a direct voltage bus having a bus voltage, said vehicle comprising:

a field-oriented controller for generating mutually orthogonal flux and torque current commands in a synchronous frame;

a first error signal generator coupled to said field-oriented controller, for subtracting feedback field current signals from said flux current command signals, for thereby generating field current error signals;

a second error signal generator coupled to said field-oriented controller, for subtracting feedback torque current signals from said torque current commands, for thereby generating torque current error signals;

a first variable-limit proportional-integral regulator coupled to said first error signal generator, and responsive to said flux current error signal, said first variable-limit proportional-integral regulator generating commanded flux voltage signals including proportional and integral components, and limiting each of said proportional and integral components of said commanded flux voltage to a value such that the sum of said proportional and integral components of said commanded flux voltage is no greater than the available bus voltage;

a second variable-limit proportional-integral regulator coupled to said second error signal generator, and responsive to said torque current error signals, said second variable-limit proportional-integral regulator generating commanded torque voltage signals including proportional and integral components, and limiting each of said proportional and integral components of said commanded torque voltage to a value selected so that the magnitude of the vector sum of said commanded flux voltage and said commanded torque voltage is no greater than the available bus voltage;

feedback means coupled to sense current in the windings of said motor, for generating said feedback field current signals and said feedback torque current signals, and for coupling said feedback field current signals to said first error signal generator and said feedback torque current signals to said second error signal generator, for thereby closing a motor controlling current feedback loop.

6. A vehicle according to claim 5, wherein said first variable-limit proportional-integral regulator further comprises:

a first multiplier coupled to receive said field current error signals, for generating a signal representative of a proportional component of said motor field voltage;

a first limiter coupled to said first multiplier to receive said signal representative of a proportional component of said motor field voltage, for limiting said signal representative of a proportional component of said motor field voltage to the maximum voltage of said bus, for thereby generating a signal representative of a limited proportional component of said motor field voltage;

a second multiplier coupled to receive said field current error signals, for generating a signal representative of the first derivative of the integral component of said field voltage;

a state-limited integrator coupled to said second multiplier for receiving said signal representative of the first derivative of the integral component of said field voltage, and for integrating said signal representative of the first derivative of the integral component of said field voltage, for thereby creating a first integrated signal, said first integrated signal being limited to a value such that the sum of said first integrated signal and said signal representative of a proportional component of said flux voltage is no greater than said bus voltage;

a first summing arrangement coupled to said first limiter and said state-limited integrator, for summing said signal representative of a limited proportional component of said motor field voltage and said first integrated signal, for generating signals representative of said commanded flux voltage.

7. A system according to claim 6, wherein said a second variable-limit proportional-integral regulator comprises:

a torque voltage limit signal generator coupled to said first variable-limit proportional-integral regulator, for responding to said commanded flux voltage, for generating a torque voltage limit signal which represents the square-root of the difference between (a) the square of said commanded flux voltage and (b) the square of the available bus voltage;

a third multiplier coupled to receive said torque current error signals, for generating a signal representative of a proportional component of the motor torque voltage;

a second limiter coupled to said third multiplier to receive said proportional component of said motor torque voltage, for limiting said proportional component of said motor torque voltage to the value represented by said torque voltage limit signal, for thereby generating a limited proportional component of said motor torque voltage;

a fourth multiplier coupled to receive said torque current error signals, for generating a signal representative of the first derivative of the integral component of said torque voltage;

a second state-limited integrator coupled to said fourth multiplier for integrating said signal representative of the first derivative of the integral component of said torque voltage, for thereby creating a second integrated signal, said second integrated signal being limited such that the sum of said second integrated signal and said limited proportional component of said motor torque voltage is no greater than said torque voltage limit signal;

a second summing arrangement, for summing said limited proportional component of said motor torque voltage and said second integrated signal, for generating said commanded torque voltage.

8. A method for controlling an induction motor driven from a direct voltage bus, comprising the steps of:

generating field current command signals and torque current command signals:

generating field current error signals by subtracting field current feedback signals from said field current command signals;

generating torque current error signals by subtracting torque current feedback signals from said torque current command signals;

multiplying said field current error signals by first and second constants to thereby produce field and second signals, respectively;

limiting said field voltage signal to a value which represents no more than the available bus voltage of said direct voltage bus, to thereby produce a limited proportional field voltage signal;

integrating said second signals in a state-limited manner, to thereby generate integrated field voltage signals, said state being limited such that the sum of said limited proportional field voltage signals and said integrated field voltage signals represents no more than said bus voltage;

summing said limited proportional field voltage signals and said integrated field voltage signals to thereby produce flux voltage command signals;

generating limiting signals representative of the square-root of the difference between (a) the square of said available bus voltage and (b) the square of said flux voltage command;

multiplying said torque error signals by third and fourth constants, to thereby produce signals representative of the proportional component of the torque voltage and a fourth signal, respectively;

limiting said signals representative of the proportional component of said torque voltage to represent a value not greater than said limiting signals, to thereby produce limited proportional torque voltage signals;

integrating said fourth signals in a state-limited manner, to thereby generate integrated torque voltage signals, said state being limited such that the sum of said limited proportional torque voltage signals and said integrated field voltage signals represents no more than said limiting signal, to thereby produce integrated torque voltage signals;

summing said proportional torque voltage signals and said integrated torque voltage signals, to produce torque voltage command signals;

converting said field voltage command signals and said torque voltage command signals into motor winding currents;

sensing said motor winding currents to produce sensed motor winding current signals;

converting said sensed motor winding current signals into said field current feedback signals and said torque current feedback signals.

* * * * *